US006633907B1

(12) United States Patent
Spencer et al.

(10) Patent No.: US 6,633,907 B1
(45) Date of Patent: Oct. 14, 2003

(54) METHODS AND SYSTEMS FOR PROVISIONING ONLINE SERVICES

(75) Inventors: Sam Spencer, Redmond, WA (US); William G. Burton, Bothell, WA (US); Christopher M. Vandenberg, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/393,545

(22) Filed: Sep. 10, 1999

(51) Int. Cl.[7] .............................................. G06F 15/16
(52) U.S. Cl. ........................ 709/223; 709/227; 709/229
(58) Field of Search ................................. 709/220, 223, 709/227, 229, 203, 219, 217

(56) References Cited

U.S. PATENT DOCUMENTS 6,067,568 A * 5/2000 Li et al. ...................... 709/223
6,272,675 B1 * 8/2001 Schrab et al. ............... 717/100

OTHER PUBLICATIONS

Getting Results with the MCIS Administration and Provisioning System Version 2.0. Microsoft Corporation, Jan. 1999. <http://www.microsoft.com/TechNet/archive/mcis/mapsstp.asp?frame=true>.*

Butler, Cales, and Petersen. Special Edition Using Microsoft Commercial Internet System. 1997, Que Corporation, pp. 544–545.*

New Microsoft Commerical Internet System 2.0 Now Available for Purchase. Microsoft Daily News Aug. 18, 1998. <www.netconcept.com/press/microsoft_daily_news_august_18.htm>.*

* cited by examiner

Primary Examiner—David Wiley
Assistant Examiner—George Neurauter
(74) Attorney, Agent, or Firm—Lee & Hayes, PLLC

(57) ABSTRACT

Methods and systems for provisioning online services are described. In the described embodiment, a framework is provided for provisioning various online services for users of an Internet Service Provider (ISP) through a web site that interfaces with the user. The inventive methods and systems make use of various programming objects to perform information collection and service provisioning functions. A master object is provided and is the focal point of a user's interaction with the framework. In the described embodiment, the master object can perform two primary functions—(1) security buffering—i.e. protecting system resources such as back end servers from a user that is not authorized to access such servers, and (2) oversight of various service configuration objects or "SCOs". The SCOs are programming objects that are each associated with a particular online service that might be specified by a user. The SCOs are separately configured to take the appropriate steps necessary to provision their own associated online service. In the described embodiment, in addition to these objects, a DS access object is provided and is the interface for a data store that stores user information. When a user enters the system, the master object is instantiated. Information that is to be used to provision various user-requested online services is collected from the user and stored in the data store. The master object is called when the information collection process is finished. The master object determines which services need to be provisioned and, correspondingly, instantiates the necessary SCOs, thereafter calling appropriate SCOs methods that enable the SCOs to provision their respective online service.

85 Claims, 5 Drawing Sheets

| Transaction Log | |
|---|---|
| Identification | |
| Operation | |
| Start Time | |
| Status | |
| Creator | |

*Fig. 3*

METHODS AND SYSTEMS FOR PROVISIONING ONLINE SERVICES

TECHNICAL FIELD

This invention relates to methods and systems for provisioning online services. In particular, the invention relates to componentized, adaptable methods and systems for provisioning online services.

BACKGROUND

Various online services are typically used by individuals and businesses to communicate information that may be of interest to others. Such online services can include Internet services such as web hosting, mail, news, and chat services to name just a few.

Online services are typically provided by a service provider such as an Internet Service Provider or (ISP). ISPs have responsibility for setting up, managing and overseeing online user accounts which, in many cases, can number into the hundreds of thousands or even millions. Many of the functions that ISPs provide in connection with user accounts have to be rendered, at least in part, manually. That is, a system administrator will physically have to get involved with the provisioning process. One reason for requiring the services of a system administrator is that system administrators have certain access privileges and rights that ensure that only authorized individuals have access to online service systems. Needless to say, this places an unreasonable burden on system administrators. In addition, as the number of online services and users has increased, problems with scalability have become more burdensome. That is, with more and more online services and users, ISPs have more than ever before an increasingly heavy burden in administering overall systems. This, in turn, can greatly impact the efficiency with which ISPs perform their tasks and provision various online services.

Another problem that is a manifestation of the growing numbers of online services and vendors that supply such services is one of integration. Consider that today's ISPs deploy services that basically form disconnected islands of application functionality in their technology infrastructure. Applications from different vendors do not integrate or inter-operate, even if they are written specifically for the same platform. This poses major problems for the ISP. ISPs either do not attempt to integrate multi-vendor applications due to the cost and/or complexity of the task, or they spend enormous amounts of time, money and resources to force such integration with little or no standardization.

Accordingly, this invention arose out of concerns associated with lessening the burden of online service provisioning on system administrators and facilitating integration of such online Internet services.

SUMMARY

A framework is presented that automates the online service provisioning process and alleviates the impact that the provisioning has on service providers. One or more programming modules now assume the role of the system administrator and function to interface with a user and collect user information. The programming modules use the collected information to ascertain which online services have been selected by a particular user, and then automatically provision or attempt to provision those services. The programming modules are programmed to take all of the steps that are necessary to set up and configure user accounts.

In the described embodiment, a master object is provided and is the programmatic focal point of a user's interaction with the framework. The master object can perform two primary functions—(1) security buffering—i.e., protecting system resources such as back end servers from a user that is not authorized to access such servers, and (2) oversight of various service configuration objects or "SCOs". The SCOs are programming objects that are each associated with a particular online service that might be specified by a user. The SCOs are separately configured to take the appropriate steps necessary to provision their own associated online service.

In the described embodiment, in addition to these objects, a DS access object is provided and is the interface for a data store that stores user information.

When a user enters the system, the master object is instantiated. Information that is to be used to provision various user-requested online services is collected from the user and stored in the data store. The master object is called when the information collection process is finished. The master object determines which services need to be provisioned and, correspondingly, instantiates the necessary SCOs, thereafter calling appropriate SCOs methods that enable the SCOs to provision their respective online service.

The SCOs are programmed and know what is needed to provision their online service and make calls to the DS access object to get user information from the data store that assist in provisioning the requested Internet service(s). The user information is provided to the SCOs which then, one-by-one, provision their respective online services.

In the described embodiment, the concept of a transaction is used to describe the process of provisioning the user-requested online services. The transaction is monitored throughout the provisioning process for purposes of implementing a rollback process, if necessary. The rollback process can be invoked in the event a configuration error occurs for any of the instantiated SCOs. The rollback process places the particular user-specified online services in a state that existed previous to the user entering the transaction.

BRIEF DESCRIPTION OF THE DRAWINGS

FIG. 3 is an exemplary portion of a transaction log in accordance with the described embodiment.

DETAILED DESCRIPTION

Overview

Figure 1:
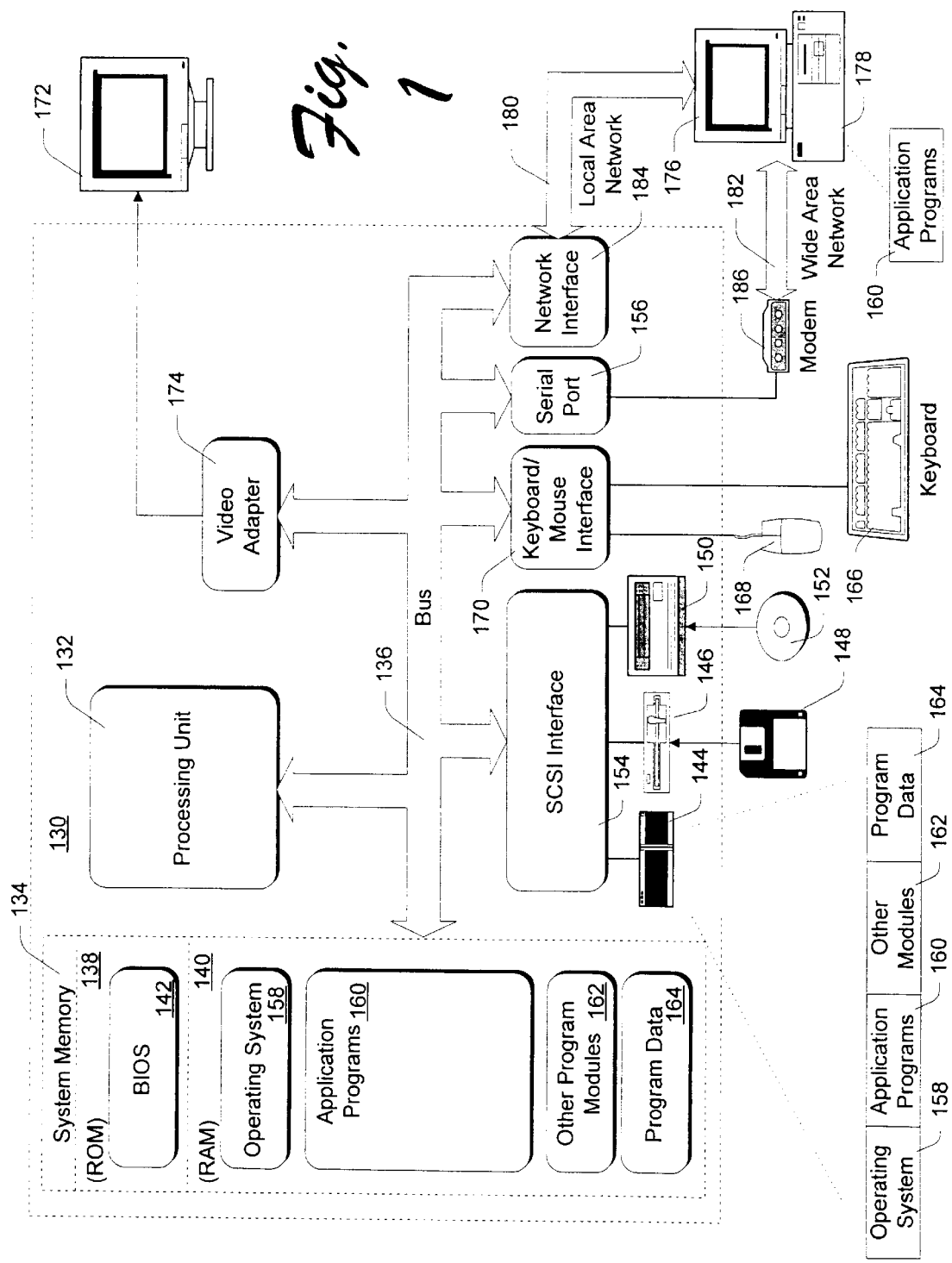
FIG. 1 is a diagram of a computer system that can be used to implement various aspects of the described embodiment.

The inventive methods and systems provide a framework of templates and tools that enable rapid automated deployment and provisioning of online services. In the described embodiment, the methods and systems can be used by ISPs to rapidly deploy and automatically provision Internet services without the need of human intervention. It will be understood, however, that the inventive methods and systems can be used in connection with any service provider that offers online services to customers. The framework provides the back-end code infrastructure for integrating and customizing the sign-up, provisioning, and user self-administration of Internet services. These services can include, without limitation, the following:

- Consumer services (e.g. basic access, mail, news, custom content, personal or family services, and value-added mail services).
- Small Business Server hosting (e.g. mail domain queuing, Web hosting).
- Internet access (e.g. tunneling and virtual private networking (VPN), RADIUS, and roaming).
- Hosted services (intranets, extranets, community services, and external Web sites).

In the described embodiment, the framework provides programming objects and application programming interfaces (APIs) that enable ISPs to build automated provisioning and administration systems. The framework is implemented in connection with one or more Internet web servers. These web servers can be remotely located relative to one another. An exemplary web server is Microsoft's Internet Information Service (IIS) web server. Although any suitable programming objects can be used to implement the described framework, it has been found particularly advantageous to define them as COM objects. COM objects are well known Microsoft computing mechanisms and are described in a book entitled *Inside Ole,* Second Edition 1995, which is authored by Kraig Brockschmidt. In COM, each object has one or more interfaces that are represented by the plug notation that will be used later. An interface is a group of semantically related functions or methods. All access to an object occurs through member functions of an interface. Defining the programming objects as COM objects is particularly useful in the context where the framework is implemented in connection with remotely-located servers. This is because communication with such servers can take place through the use of Distributed COM (DCOM) techniques. DCOM is a well-known Microsoft computing mechanism that employs the use of stub-proxy pairs to facilitate communication across thread, process and machine boundaries.

The specifically described framework includes a master object, a DS access object, and one or more service configuration objects (SCOs).

The master object is a core component and performs security buffering functions as well as SCO oversight functions. By "security buffering" is meant that the master object includes all of the necessary administrative privileges and rights to enable it to create and/or modify various user-specified Internet services. That way, system resources such as back-end servers are protected from a user who does not and should not have such administrative privileges. The master object's oversight functions include creating, destroying, and managing SCOs. In this manner, the master object is the single programmatic point of contact when a user wishes to sign-up (set-up) or administer a Web site.

The DS access object serves as an interface to a data store that contains user information that is necessary for configuring Internet services. Requests for data that is contained in the data store are routed through the DS access object.

The SCOs are objects that are programmed to actually provision and administer the various user-specified Internet services.

In the described embodiment, there is one SCO associated with each Internet service that can be specified by a user. In addition, SCOs can be separately defined by an ISP to provision one or more new Internet services. In this manner, the SCOs provide an opportunity for ISPs to specially configure their specific framework to accommodate third party services that might not be available or contemplated when the framework is initially established by an ISP.

In operation, a user provides information during a user session that defines a "transaction". A transaction is considered as a set of operations that are to be performed in order to appropriately provision services that are selected by a user. At the start of a user session, a master object is instantiated. User information is collected and stored in the data store via the DS access object. During the information collection process, a user specifies what Internet services and/or configurations they desire to purchase from the ISP. When all of the information has been collected, the master object is invoked using an identifier that is unique to the particular transaction. The master object determines which Internet services are to be configured and calls an appropriate service configuration object (SCO) for each service. The SCOs, in turn, make calls to the DS access object and are passed data that allows them to provision their service accordingly. Thus, multiple different Internet services can be provisioned without the need for intervention by a system administrator.

In addition, aspects of the inventive methods and systems monitor the transaction for the various specified Internet services. If a configuration error occurs (i.e. one of the set of operations that is necessary for provisioning the selected services cannot be performed), the system is capable of conducting a "rollback" process that returns the Internet services to a previous state thus preserving the integrity of the overall system. In this way, the user's services can remain operational, albeit without the newly specified services or configurations.

Exemplary Computer System

Preliminarily, FIG. 1 shows a general example of a computer 130 that can be used in accordance with the invention. Various numbers of computers such as that shown can be used in the context of a distributed computing environment.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during startup, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Framework Architecture

Figure 2:
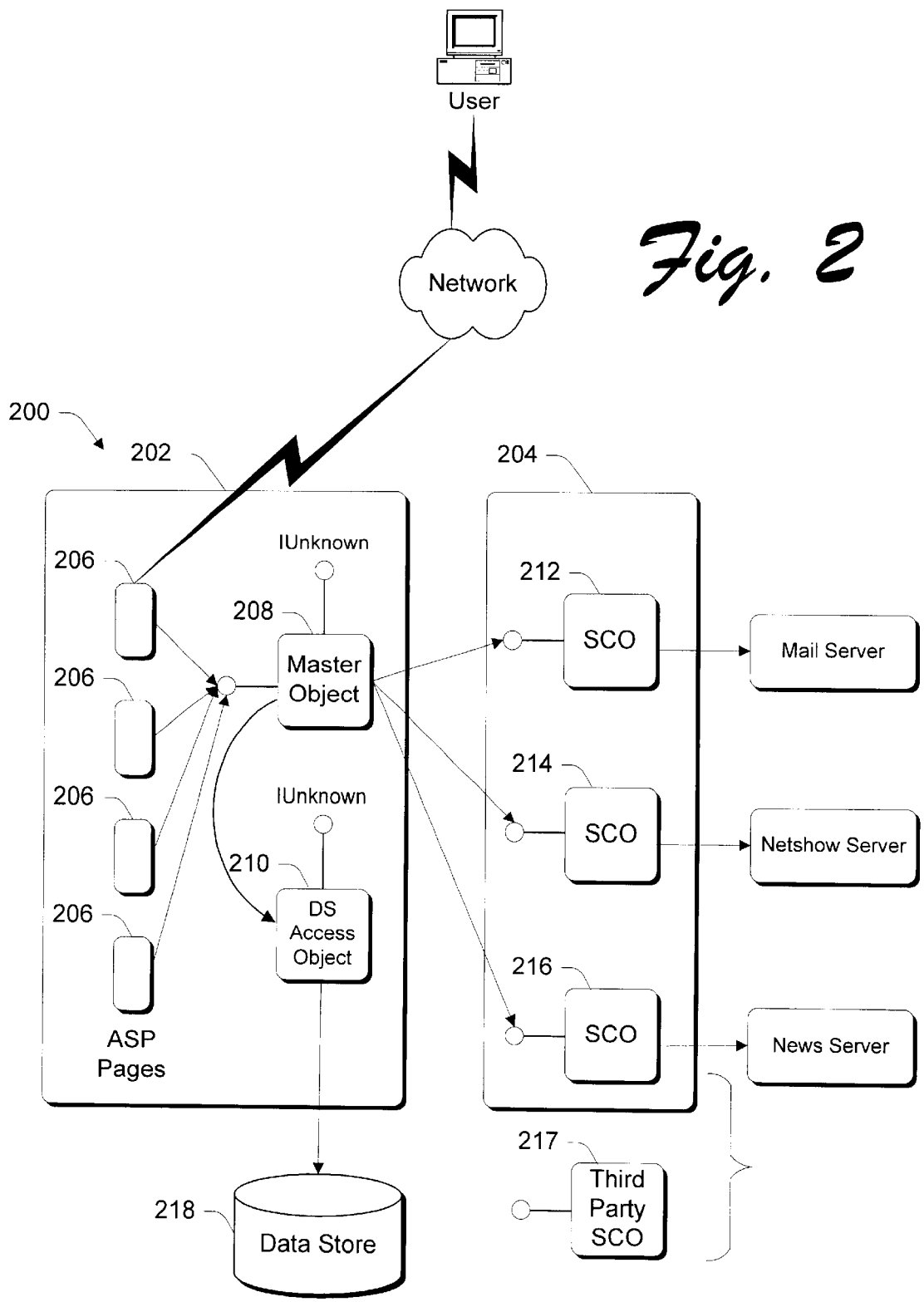
FIG. 2 is a high level block diagram of an exemplary system in accordance with the described embodiment.

FIG. 2 shows an exemplary provisioning system 200 that includes a first software module 202 and a second software module 204. The first software module 202 is programmed to collect and place in storage user information that is associated with a user that desires to provide online services, or to modify currently-provided online services. The second software module 204 is programmed to receive instructions from the first software module 202 and, responsive thereto, configure multiple different online services. In the described embodiment, first software module 202 includes one or more Active Server Pages (ASPS) 206, a master object 208 and a DS access object 210. Second software module 204 includes a plurality of exemplary service configuration objects or "SCOs" 212, 214, and 216. One or more third party SCOs 217 can be separately programmed and provided as will become apparent below. A data store 218 is provided and is configured to hold user information that is collected during an information collection process. A user or client communicates with provisioning system 200 through a network connection such as the Internet. The above-described framework constitutes but one example of a framework that is suitable for implementing the inventive methods and systems discussed herein. Although the framework is discussed in terms of software modules that implement specific functionalities, it is to be understood that the described functionalities can be implemented in any suitable manner. Accordingly, this specific example is not intended to limit the invention to the particular disclosed architecture.

Transaction Processing

When a user desires to set up or administer particular online services such as Internet services, the described embodiment creates a transaction in the data store 218. In this example, a transaction is created by the first software module 202. An exemplary portion of a transaction log is shown in FIG. 3 and includes various fields that hold information that can be used to provision an account. Among the exemplary fields are an "Identification" or ID field for holding an ID value that is unique to a particular transaction, an "Operation" field for indicating the type of operations that are going to be necessary (i.e. provision a mail server at a particular level), a "Start Time" field for holding the starting time of a particular transaction, a "Status" field for holding the status of a particular transaction (e.g. has the provisioning processing of an SCO been successful?), and a "Creator" field for holding the name of the creator of the transaction. The transaction or transaction log is an important feature of the inventive systems and methods insofar as its provision of an audit trail in the event that a rollback process has to be initiated. Specifically, and as is described below in more detail, during the provisioning of the user-specified services certain errors can occur. If these errors are serious enough, then it might be necessary to rollback the system to a previous state. The transaction or transaction log keeps track of information that is useful for rolling back the transaction. The transaction or transaction log is particularly useful because certain or many of the SCOs might not keep track of the information that is necessary for rollback processing.

Figure 4:
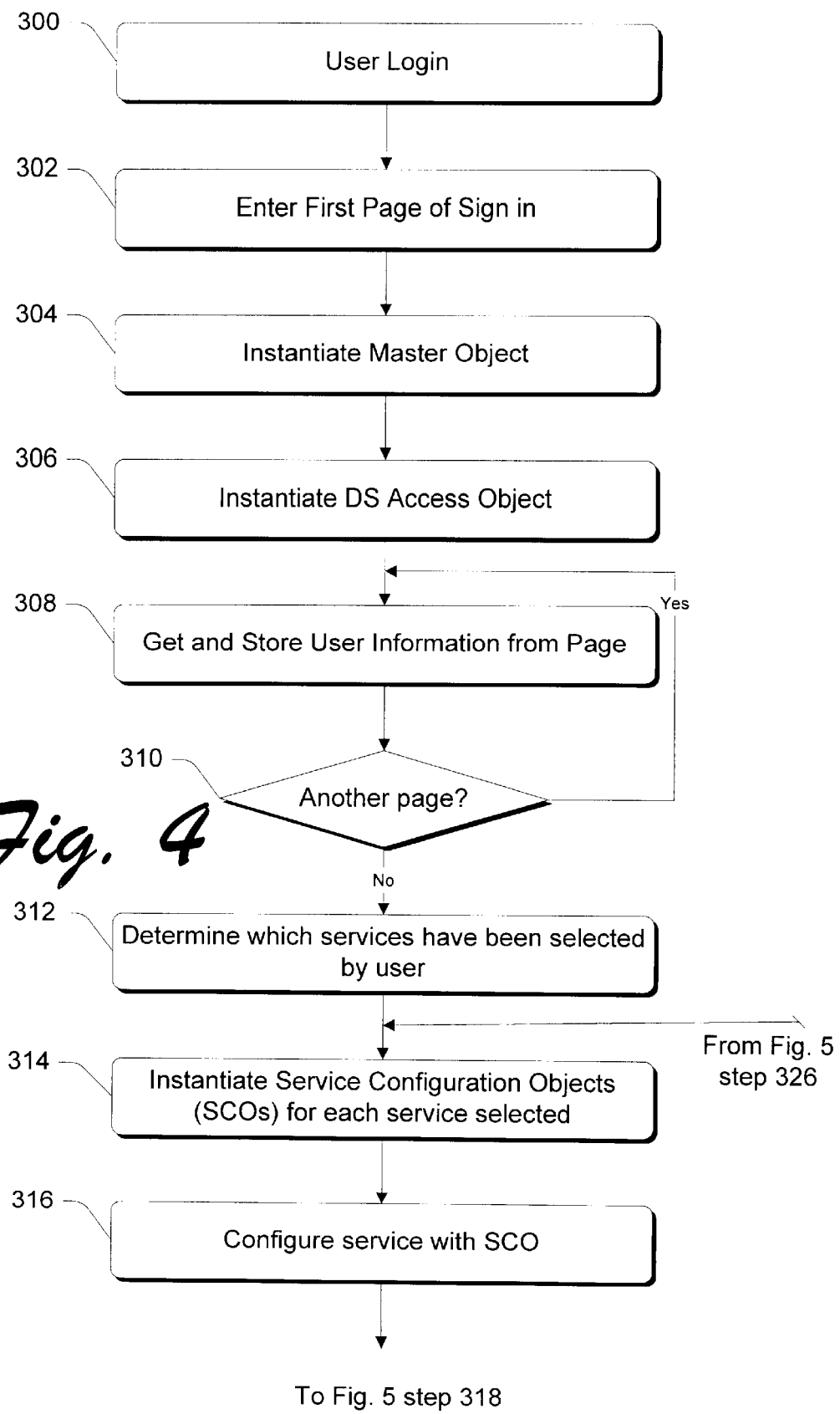
FIG. 4 is a flow diagram that describes a method in accordance with the described embodiment.

FIG. 4 shows a flow diagram that describes steps in a method in accordance with the described embodiment. At step 300 a user logs into the provisioning system 200 and enters the first page of a sign in (step 302). The sign in page and each of the additional pages encountered by the user, in this example, are defined by the Active Server Pages 206 (FIG. 2) which constitute but one example of a collection mechanism that interfaces with a user. Active Server Pages are files on a Web server that enable the programming of Web sites for signing up customers and administering their choices of plans and Internet services. A plan is simply a defined collection of Internet services that are to be provisioned for a user. A plan can be predefined, or, can be built dynamically based upon user input. Accordingly, the framework of software modules 202 and 204 is exposed through a series of ASP pages on the Web server. Step 304 instantiates the master object 208. In this example, the master object 208 is instantiated by an ASP 206 when the user initiates a session or starts a transaction. Master object 208 is an object that is programmed to control security, and administration and provisioning. The master object 208 is a security buffer for the user in that the master object "impersonates" a domain administrator by retaining the administrative privileges and rights that are necessary to provision the user-selected Internet services. These administrative privileges and rights are insulated from the user through the master object. The master object also performs administrative and provisioning functions by its oversight of the SCOs as will be described.

Step 306 instantiates the DS access object 210. The DS access object 210 is an interface into the data store 218. The DS access object has methods that allow a user to create and build a transaction. The transaction or transaction log that is built is stored in the data store 218 and can either be processed at the time it is built, or later sometime.

As part of the transaction-building process, when a new transaction is started, a unique ID is assigned for that operation. This unique ID is used to identify the transaction and the associated information that is subsequently used to provision the specified Internet services. Step 308 gets the user's information from an ASP 206 and stores the information in the data store 218. Step 310 checks to see whether there is another ASP 206. If there is, then the method loops back to step 308 and acquires any additional user information. In this way, the transaction is built in the data store 218.

In the described embodiment, the information that is collected and stored by steps 308 and 310 can be used, in this example, for either signing users up for various Internet services, such as would be done when a user opens a new account, or for administering already-existing accounts. With respect to signing users up for new accounts, the user is led through a series of questions that are user-specific. If the user is an organization, questions can include the organization name, address, and billing information. Additionally, the user is led through a plan selection process where they choose the ISP offered services to which they would like to subscribe. All of the information that is gathered during this process is stored in the data store 218. With respect to account administration, after a user logs in and is authenticated, they are presented with a display that defines a personalized administration environment based on the data that persists in the data store 218. Displayed for the user is a list of the current settings for each of the services to which the user has subscribed. Step 308 enables a user to modify any of the individual settings for any of their services. All of these modified settings are stored in the data store 218 in the form of a transaction that is defined for the user.

Continuing now with a description of the flow diagram of FIG. 4, at this point all of the user's information has been collected and stored in the data store 218. Step 312 determines which services have been selected by the user. This is done by considering the transaction that has been configured and stored in the data store 218. In the described embodiment, a configuration process is initiated by a series of calls to and from the master object 208. Specifically, a method is first called on the master object 208 that passes in the unique ID for the transaction. The master object 208 then calls the DS access object 210 and receives a list of SCOs that have been specified by and defined for the user's transaction. The master object reviews the list and takes the steps that are necessary to ensure that the user-selected services are configured. The master object does this by preferably selecting only the SCOs that are associated with the user-selected services and calling on the selected SCOs that are defined in the transaction. In this example, in step 314 the master object instantiates the necessary SCOs and, in step 316, the master object notifies each SCO by calling methods on each SCO that enable the SCOs to initiate a provisioning process that configures their own respective services. The SCOs are programmed to take all of the necessary steps in order to configure the service with which they are associated. Accordingly, the SCO methods perform the provisioning actions for the particular service. The SCO methods typically obtain configuration information from the data store 218 and perform the actions that are required to configure a particular service. These actions can include creating entries in the data store, building or modifying standalone service configuration files on disk, calling a service configuration API directly, or even sending e-mail to introduce the user to the service to which they have subscribed. In this example, each SCO is capable of reading its data from the data store 218 so that it has the information that it needs to provision its services. The SCOs are also capable of writing data to the data store, e.g. to update particular fields in response to user-specified additions or modifications.

In the described embodiment, the SCOs are instantiated serially in the order that they appear in a list that is received by the master object 208 when it calls the DS access object 210. The SCOs then configure their services in that order, before another SCO is instantiated. So, in this example, step 314 instantiates a first of possibly a plurality of SCOs and in step 316 the instantiated SCO configures its particular service.

In the example of FIG. 2, the three SCOs 212, 214, and 216 are each associated with a different respective online service, i.e. a mail service, a netshow service, and a news service. Each of the SCOs is programmed and knows the us specific steps that it must take to configured the service with which it is associated. Accordingly, in this example, configuring the user-selected services might involve configuring respective associated servers, i.e. a mail server, a netshow server, and a news server. As mentioned above, these servers can be remotely located relative to one another with the configuration taking place, in the described embodiment, through the use of DCOM techniques.

Third Party Service Configuration Objects

One advantage of the presently described embodiment is that one or more service configurations objects (SCOs) can be added to or incorporated into a previously-defined collection of SCOs, e.g. software module 204. FIG. 2 shows such an added SCO 217. The added SCOs can be programmed at a later date to incorporate online services that might not have been available at a time when the software module was established. By providing an appropriate interface on such added SCOs, the master object can make its calls without the knowledge that it is calling a new SCO.

Configuration Monitoring and Rollback

In the described embodiment, provisioning system 200 includes a configuration monitoring process that monitors the configuration processing that is undertaken by each SCO for any configuration errors. In the event that an error in the configuration process occurs, the provisioning system is capable of "rolling back" the state of the system or, in this case the state of the Internet services, to a previous state. This way, errors that might find themselves into a particular SCO configuration are not allowed to possibly corrupt the entire configuration process. Thus, the integrity of the overall system can be preserved.

Figure 5:
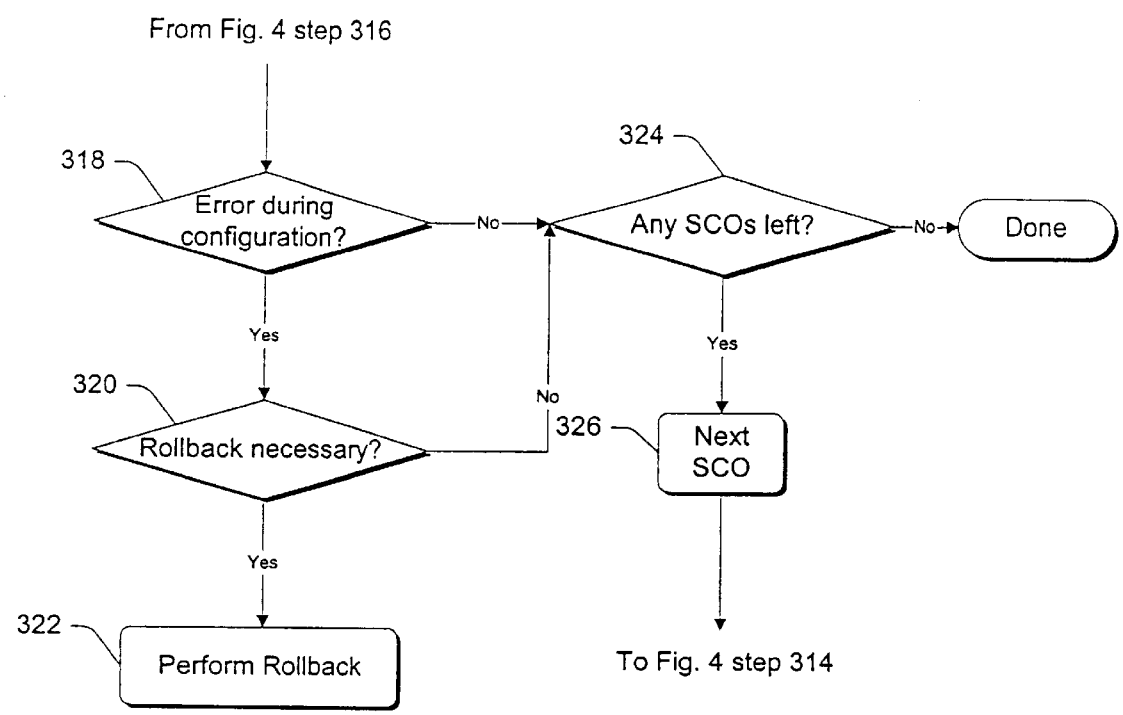
FIG. 5 is a flow diagram that is a continuation of the FIG. 3 flow diagram.

FIG. 5, which is a continuation of the flow diagram of FIG. 4, show steps in a configuration monitoring method. Recall that at this point in the processing, a first of the SCOs had been instantiated and is (was) in the process of configuring its associated service (step 316). Step 318 (FIG. 5) monitors the configuration process and determines whether any configuration errors occur. If a configuration error occurs, then step 320 determines whether rollback processing is necessary. This is because there are certain errors that might not require the system to be rolled back. One advantage of the described embodiment is that system administrators are free to define the conditions that require their particular system to undergo a rollback process. Thus, the SCOs can be separately programmed to continue the provisioning process in the event that certain errors occur, but to terminate the provisioning process if certain other errors occur. If a rollback is determined to be necessary, then step 322 initiates and performs the rollback processing. If step 320 determines that rollback processing is not necessary, then step 324 determines whether there are any additional SCOs that need to be instantiated to provision the user-requested Internet services. If additional SCOs remain to be instantiated, then step 326 advances to the next SCO which loops back to step 314 (FIG. 4). If there are no additional SCOs to be instantiated, then the provisioning processing is done. When the rollback processing is determined to be necessary at step 320, a rollback transaction method is called on the master object 208 (FIG. 2). The master object 208 then calls a rollback method on each of the SCOs in the reverse order that the SCOs were instantiated. Each of the SCOs is responsible for rolling back as best it can. An SCO's rollback method essentially performs the reverse of whatever operations it performed when it configured or attempted to configure its service. The actions required to undo the service configurations might include removing Directory Service entries, removing or restoring standalone service configuration files on disk, calling a service configuration API directory to disable access, or even sending e-mail to system administration personnel notifying them of the errors. During the rollback process, the SCOs draw upon the information that is contained in the transaction log. This information can include, in addition to the information described above, information that relates to the previous configuration of the service with which a particular SCO is associated. Thus, by calling the DS Access object 210, each SCO can receive its previous configuration information and attempt to rollback its service.

EXAMPLE

As an example, consider the following: The manager of a human resources department of a large corporation want to set up an intranet information system for her department. She does not have the expertise to create and maintain such a system in-house. She therefore chooses an ISP that has implemented the inventive provisioning system 200 to host her site. She logs in to the ISP and chooses "Create New Site" from the Home Page. She is then led through a series of ASP pages that request information about the site, her company, billing, and information about the services that she wishes to provision for her site. The data is stored in the data store 218 as each ASP page is left. At the last ASP page, the manager re-checks her information and presses "Finish". The ASP code from this last page checks the data for validity and then passes a unique ID for the manager to the master object 208. The master object 208 determines which services need to be provisioned and calls a service configuration object for each.

Conclusion

The inventive systems and methods provide a componentized online service provisioning system that can greatly reduce the amount of time a system administrator (e.g. an ISP) must spend setting up or administering various online accounts. The described embodiment provides a collection of open application solutions, templates, and components that enable the ISPs to rapidly build and deploy a broad range of end-user customizable services. Security is provided by interposing a master object between a user that desires to set up or modify an account and the object mechanisms that are programmed to perform the provisioning functions. The master object serves as a security buffer in this regard. The master object also serves to organize the provisioning processing by ascertaining which services have been selected for addition or modification by a user, and then ensuring that the appropriate responsible objects for accomplishing the provisioning are called. The overall componentized nature of the described embodiment also carries with it advantages that enable ISPs to "plug into" second module 204 (FIG. 2). This can be done by providing separately ISP-programmed SCOs that might be configured to provision Internet services that were not originally a part of or contemplated by the system when it was initially put in place. Thus, an adaptable, automated, modifiable provisioning template is provided that can greatly enhance the flexibility with which an ISP can provide its services.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of provisioning online services comprising:
   receiving information from a user that desires to either set up an online account for online services or modify an existing account for online services, said receiving being performed without intervention from a human system administrator;
   instantiating a master object that is configured to initiate a configuration process for configuring one or more online services that are specified by the user; and
   initiating the configuration process with the master object.

2. The method of claim 1, wherein said initiating of the configuration process comprises instantiating a service configuration object (SCO) to configure a particular online service that is specified by the user.

3. The method of claim 1, wherein said initiating of the configuration process comprises instantiating a plurality of service configuration objects (SCOs) to configure a different online service that is specified by the user.

4. The method of claim 1 further comprising:
monitoring the configuration process;
determining whether a configuration error occurs;
determining whether a rollback process is necessary to return a particular specified online service to a previous state responsive to a configuration error occurring; and
initiating a rollback process in the event that the rollback process is necessary.

5. The method of claim 1, wherein the master object is programmed with administrative privileges that the user does not have.

6. A computer-readable medium having computer-readable instructions which, when executed by a computer, perform the steps of claim 1.

7. The method of claim 1, wherein said configuration process takes place across one or more machine boundaries.

8. A method of provisioning online services comprising:
collecting user information from a user that desires to set up an online account for online services or modify an existing account for online services, said collecting being performed without intervention from a human system administrator;
defining a plurality of service configuration objects (SCOs), each of which being programmed to provision a particular online service that is specified by a user;
notifying the SCOs that they are to provision their particular associated online service; and
using the SCOs, initiating a provisioning process that uses the user information to provision the particular online services.

9. The method of claim 8, wherein said defining comprises:
determining from the user information which online services have been identified by the user; and
selecting only SCOs that are associated with the identified online services.

10. The method of claim 9, wherein said selecting comprises instantiating the SCOs.

11. The method of claim 9, wherein said selecting comprises instantiating the SCOs, the SCOs being instantiated as COM objects.

12. The method of claim 9, wherein said selecting comprises instantiating the SCOs after said determining.

13. The method of claim 8, wherein said defining comprises instantiating the SCOs, said defining, notifying, and using steps taking place serially for the SCOs.

14. The method of claim 8 further comprising:
monitoring the provisioning process for errors; and
determining whether a rollback process is necessary in the event of an error.

15. The method of claim 14 further comprising initiating the rollback process in the event it is necessary.

16. The method of claim 14, wherein said monitoring comprises:
creating a transaction log that is configured to log information during the provisioning process; and
maintaining information in the transaction log during the provisioning process.

17. The method of claim 16 further comprising initiating the rollback process in the event it is necessary, said initiating comprising using the transaction log to assist in rolling back one or more online services to a previous state.

18. The method of claim 14 further comprising initiating the rollback process in the event it is necessary, wherein said initiating comprises rolling back one or more online services to a previous state in the order that the online services were provisioned.

19. The method of claim 8, wherein said provisioning process takes place across one or more machine boundaries.

20. A computer-readable medium having computer-readable instructions thereon which, when executed by a computer perform the steps of claim 8.

21. A method of provisioning online services comprising:
programming a first software module to collect and place in storage, without intervention from a human system administrator, user information that is associated with a user that desires to set up an online account for online services or modify an existing account for online services; and
programming a second software module to receive instructions from the first software module and responsive thereto configure multiple different online services.

22. The method of claim 21 further comprising provisioning multiple different online services using the first and second software modules.

23. The method of claim 21, wherein the programming of the first software module comprises programming the first software module to create a transaction log that holds information that can be used to provision a user account.

24. The method of claim 21, wherein the programming of the second software module comprises programming a plurality of service configuration objects (SCOs) to separately configure different online services.

25. The method of claim 24, wherein the plurality of service configuration objects are programmed as COM objects.

26. The method of claim 24, wherein the programming of the second software module comprises adding a service configuration object (SCO) to a previously-defined collection of service configuration objects (SCOs).

27. The method of claim 21, wherein:
the programming of the first software module comprises programming a master object to make calls to other programming objects for provisioning a user account; and
the programming of the second software module comprises programming a plurality of service configuration objects (SCOs) to receive calls from the master object and, responsive thereto, separately configure different online services.

28. The method of claim 27, wherein the master object and the service configuration objects are programmed as COM objects.

29. The method of claim 21, wherein said provisioning comprises provisioning the multiple different online services on servers that are located remotely relative to one another.

30. A method of provisioning online services comprising:
to associating an online service with a service configuration object (SCO); and
programming the service configuration object (SCO) to initiate a provisioning process in which the service configuration object (SCO) attempts to automatically provision the online service with which it is associated without intervention from a human system administrator.

31. The method of claim 30 further comprising incorporating the programmed service configuration object (SCO)

into a software module that contains a plurality of programmed service configuration objects (SCOs) individual ones of which being programmed to provision different online services.

32. The method of claim 30, wherein said programming comprises programming the service configuration object (SCO) to receive one or more calls and, responsive thereto, initiate the provisioning process.

33. The method of claim 30, wherein said programming of the service configuration object (SCO) comprises programming the object as a COM object.

34. An online service-provisioning architecture comprising:
  a collection mechanism configured to interface with a user without requiring intervention by a human system administrator, and collect and store user information from a user that desires to set up an online account for online services or modify an existing account for online services;
  a master object that is programmed to make a plurality of calls to enable one or more online services that might be selected by a user to be provisioned; and
  one or more service configuration objects (SCOs) communicatively associated with the master object, individual service configuration objects (SCOs) being associated with different online services that might be selected by a user, each service configuration object being able to receive one or more calls from the master object and, responsive thereto, attempt to provision its associated online service.

35. The online service-provisioning architecture of claim 34 further comprising a data store configured to hold user information that is collected by the collection mechanism.

36. The online service-provisioning architecture of claim 35 further comprising a transaction log stored in the data store, the transaction log being configured to contain information that can be used by the one or more service configuration objects (SCOs) to provision their associated online service.

37. The online service-provisioning architecture of claim 36, wherein the transaction log comprises:
  an identification portion that holds an ID value that is associated with a transaction;
  an operation portion indicative of one or more operations that are necessary for provisioning one or more online services; and
  a status portion indicative of the status of a particular user transaction that attempts to provision user-selected online services.

38. The online service-provisioning architecture of claim 37, wherein the transaction log further comprises:
  a start time portion indicative of the start time of a particular user transaction; and
  a creator portion for holding the name of the creator of the transaction.

39. The online service-provisioning architecture of claim 34, wherein at least one of the master object and the one or more service configuration objects are programmed as COM objects.

40. A computer readable medium having an online service-provisioning data structure stored thereon, the online service-provisioning data structure comprising:
  an identification portion that holds an ID value that is associated with a user that desires to either provide online services or to modify currently-provided online services;
  an operation portion indicative of one or more operations that are necessary for provisioning one or more online services; and
  a status portion indicative of the status of a particular user transaction that attempts to provision user-selected online services,
  said data structure being configured to facilitate service provisioning without requiring intervention from a human system administrator.

41. The computer-readable medium of claim 40 further comprising:
  a start time portion indicative of the start time of a particular user transaction; and
  a creator portion for holding the name of the creator of the transaction.

42. One or more programming objects programmed to use the data structure of claim 40 in a transaction for provisioning user-selected online services.

43. The programming objects of claim 42, one of which being configured as a master object that is programmed to make one or more calls to other objects that are programmed to provision the user-selected online services.

44. The programming objects of claim 42, one of which being configured as a service configuration object that is programmed to provision the user-selected online services.

45. The programming objects of claim 42:
  one of which being configured as a master object that is programmed to make one or more calls to other objects that are programmed to provision the user-selected online services; and others of which being configured as service configuration objects (SCOs) that are programmed to receive calls from the master object and responsive thereto provision associated user-selected online services.

46. An online service provisioning system comprising:
  a memory;
  one or more service configuration objects (SCOs) resident on the memory, an individual service configuration object (SCO) being programmed to initiate a provisioning process in which an online service can be automatically provisioned by the service configuration object (SCO), without requiring any intervention from a human system administrator.

47. The online service provisioning system of claim 46, wherein the individual service configuration object (SCO) is programmed to receive one or more calls that are associated with the provisioning process of service configuration object (SCO).

48. A method of provisioning online services comprising:
  collecting user information from a user that desires to set up an online account for online services or modify an existing account for online services;
  defining a plurality of service configuration objects (SCOs), each of which being programmed to provision a particular online service that is specified by a user, said defining comprising determining from the user information which online services have been identified by the user; and selecting only SCOs that are associated with the identified online services by instantiating the SCOs as COM objects;
  notifying the SCOs that they are to provision their particular associated online service; and
  using the SCOs, initiating a provisioning process that uses the user information to provision the particular online services.

49. The method of claim 48, wherein said selecting comprises instantiating the SCOs after said determining.

50. The method of claim 48, wherein said defining, notifying, and using steps taking place serially for the SCOs.

51. The method of claim 48 further comprising:

monitoring the provisioning process for errors; and determining whether a rollback process is necessary in the event of an error.

52. The method of claim 51 further comprising initiating the rollback process in the event it is necessary.

53. The method of claim 51, wherein said monitoring comprises:

creating a transaction log that is configured to log information during the provisioning process; and maintaining information in the transaction log during the provisioning process.

54. The method of claim 53 further comprising initiating the rollback process in the event it is necessary, said initiating comprising using the transaction log to assist in rolling back one or more online services to a previous state.

55. The method of claim 51 further comprising initiating the rollback process in the event it is necessary, wherein said initiating comprises rolling back one or more online services to a previous state in the order that the online services were provisioned.

56. The method of claim 48, wherein said provisioning process takes place across one or more machine boundaries.

57. A computer-readable medium having computer-readable instructions thereon which, when executed by a computer perform the steps of claim 48.

58. A method of provisioning online services comprising:

programming a first software module to collect and place in storage user information that is associated with a user that desires to set up an online account for online services or modify an existing account for online services; and programming a second software module to receive instructions from the first software module and responsive thereto configure multiple different online services, said programming of the second software module comprising programming a plurality of service configuration objects (SCOs) to separately configure different online services, the SCOs comprising COM objects.

59. The method of claim 58 further comprising provisioning multiple different online services using the first and second software modules.

60. The method of claim 58, wherein the programming of the first software module comprises programming the first software module to create a transaction log that holds information that can be used to provision a user account.

61. The method of claim 58, wherein the programming of the second software module comprises adding a service configuration object (SCO) to a previously-defined collection of service configuration objects (SCOs).

62. The method of claim 58, wherein:

the programming of the first software module comprises programming a master object to make calls to other programming objects for provisioning a user account; and the programming of the second software module comprises programming a plurality of service configuration objects (SCOs) to receive calls from the master object and, responsive thereto, separately configure different online services.

63. The method of claim 62, wherein the master object is programmed as a COM object.

64. The method of claim 58, wherein said provisioning comprises provisioning the multiple different online services on servers that are located remotely relative to one another.

65. A method of provisioning online services comprising:

programming a first software module to collect and place in storage user information that is associated with a user that desires to set up an online account for online services or modify an existing account for online services; and programming a second software module to receive instructions from the first software module and responsive thereto configure multiple different online services, said programming of the second software module comprising programming a plurality of service configuration objects (SCOs) to separately configured different online services, and adding a service configuration object (SCO) to a previously-defined collection of service configuration objects (SCOs).

66. The method of claim 65 further comprising provisioning multiple different online services using the first and second software modules.

67. The method of claim 65, wherein the programming of the first software module comprises programming the first software module to create a transaction log that holds information that can be used to provision a user account.

68. The method of claim 65, wherein:

the programming of the first software module comprises programming a master object to make calls to other programming objects for provisioning a user account; and the programming of the second software module comprises programming a plurality of service configuration objects (SCOs) to receive calls from the master object and, responsive thereto, separately configure different online services.

69. The method of claim 65, wherein said provisioning comprises provisioning the multiple different online services on servers that are located remotely relative to one another.

70. A method of provisioning online services comprising:

programming a first software module to collect and place in storage user information that is associated with a user that desires to set up an online account for online services or modify an existing account for online services, the programming of the first software module comprising programming a master object to make calls to other programming objects for provisioning a user account; and programming a second software module to receive instructions from the first software module and responsive thereto configure multiple different online services, the programming of the second software module comprising programming a plurality of service configuration objects (SCOs) to receive calls from the master object and, responsive thereto, separately configure different online services;

the master object and the service configuration objects being programmed as COM objects.

71. The method of claim 70 further comprising provisioning multiple different online services using the first and second software modules.

72. The method of claim 70, wherein the programming of the first software module comprises programming the first software module to create a transaction log that holds information that can be used to provision a user account.

73. The method of claim 70, wherein the programming of the second software module comprises programming a plurality of service configuration objects (SCOs) to separately configure different online services.

74. The method of claim 70, wherein the programming of the second software module comprises adding a service configuration object (SCO) to a previously-defined collection of service configuration objects (SCOs).

75. The method of claim 70, wherein said provisioning comprises provisioning the multiple different online services on servers that are located remotely relative to one another.

76. A method of provisioning online services comprising:

associating an online service with a service configuration object (SCO); and programming the service configuration object (SCO) to initiate a provisioning process in which the service configuration object (SCO) attempts to automatically provision the online service with which it is associated, said programming of the SCO comprising programming the object as a COM object.

77. The method of claim 76 further comprising incorporating the programmed service configuration object (SCO) into a software module that contains a plurality of programmed service configuration objects (SCOs) individual ones of which being programmed to provision different online services.

78. The method of claim 76, wherein said programming comprises programming the service configuration object (SCO) to receive one or more calls and, responsive thereto, initiate the provisioning process.

79. An online service-provisioning architecture comprising:

a collection mechanism configured to interface with a user, and collect and store user information from a user that desires to set up an online account for online services or modify an existing account for online services;

a master object that is programmed to make a plurality of calls to enable one or more online services that might be selected by a user to be provisioned;

one or more service configuration objects (SCOs) communicatively associated with the master object, individual service configuration objects (SCOs) being associated with different online services that might be selected by a user, each service configuration object being able to receive one or more calls from the master object and, responsive thereto, attempt to provision its associated online service;

a data store configured to hold user information that is collected by the collection mechanism;

a transaction log stored in the data store, the transaction log being configured to contain information that can be used by the one or more service configuration objects (SCOs) to provision their associated online service, wherein the transaction log comprises:

an identification portion that holds an ID value that is associated with a transaction;

an operation portion indicative of one or more operations that are necessary for provisioning one or more online services; and a status portion indicative of the status of a particular user transaction that attempts to provision user-selected online services.

80. The online service-provisioning architecture of claim 79, wherein the transaction log further comprises:

a start time portion indicative of the start time of a particular user transaction; and a creator portion for holding the name of the creator of the transaction.

81. An online service-provisioning architecture comprising:

a collection mechanism configured to interface with a user, and collect and store user information from a user that desires to set up an online account for online services or modify an existing account for online services;

a master object that is programmed to make a plurality of calls to enable one or more online services that might be selected by a user to be provisioned;

one or more service configuration objects (SCOs) communicatively associated with the master object, individual service configuration objects (SCOs) being associated with different online services that might be selected by a user, each service configuration object being able to receive one or more calls from the master object and, responsive thereto, attempt to provision its associated online service; and wherein at least one of the master object and the one or more service configuration objects are programmed as COM objects.

82. The online service-provisioning architecture of claim 81 further comprising a data store configured to hold user information that is collected by the collection mechanism.

83. The online service-provisioning architecture of claim 82 further comprising a transaction log stored in the data store, the transaction log being configured to contain information that can be used by the one or more service configuration objects (SCOs) to provision their associated online service.

84. The online service-provisioning architecture of claim 83, wherein the transaction log comprises:

an identification portion that holds an ID value that is associated with a transaction;

an operation portion indicative of one or more operations that are necessary for provisioning one or more online services; and a status portion indicative of the status of a particular user transaction that attempts to provision user-selected online services.

85. The online service-provisioning architecture of claim 84, wherein the transaction log further comprises:

a start time portion indicative of the start time of a particular user transaction; and a creator portion for holding the name of the creator of the transaction.

* * * * *

UNITED STATES PATENT AND TRADEMARK OFFICE
CERTIFICATE OF CORRECTION

PATENT NO.    : 6,633,907 B1
DATED         : October 14, 2003
INVENTOR(S)   : Spencer et al.

It is certified that error appears in the above-identified patent and that said Letters Patent is hereby corrected as shown below:

<u>Column 8,</u>
Line 49, delete "us" after "the".

<u>Column 12,</u>
Line 58, delete "to" after "comprising:".

Signed and Sealed this

Seventeenth Day of February, 2004

JON W. DUDAS
*Acting Director of the United States Patent and Trademark Office*